US010841995B1

(12) United States Patent
Zaveruha et al.

(10) Patent No.: US 10,841,995 B1
(45) Date of Patent: Nov. 17, 2020

(54) TRANSMISSION CIRCUIT FOR POWERLINE COMMISSIONING TECHNIQUES

(71) Applicant: ABL IP Holding LLC, Atlanta, GA (US)

(72) Inventors: Ryan A. Zaveruha, Stratford, CT (US); Richard Lee Westrick, Jr., Social Circle, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/774,475

(22) Filed: Jan. 28, 2020

(51) Int. Cl.
| | |
|---|---|
| *H05B 37/02* | (2006.01) |
| *H05B 37/00* | (2006.01) |
| *H05B 45/305* | (2020.01) |
| *H05B 47/185* | (2020.01) |
| *H05B 47/105* | (2020.01) |
| *H05B 47/18* | (2020.01) |
| *H05B 47/175* | (2020.01) |
| *H05B 47/11* | (2020.01) |

(52) U.S. Cl.
CPC ......... *H05B 45/305* (2020.01); *H05B 47/105* (2020.01); *H05B 47/11* (2020.01); *H05B 47/175* (2020.01); *H05B 47/18* (2020.01); *H05B 47/185* (2020.01)

(58) Field of Classification Search
CPC ...... H05B 45/10; H05B 47/175; H05B 47/19; H05B 47/11; H05B 47/185; H05B 45/20; H05B 47/18; H05B 45/00; H05B 45/305; H05B 41/14; Y02B 20/48; H04B 3/54; H04B 3/542

See application file for complete search history.

(56) References Cited

U.S. PATENT DOCUMENTS

| | | | |
|---|---|---|---|
| 7,266,344 B2 | 9/2007 | Rodriguez | |
| 7,355,523 B2 | 4/2008 | Sid | |
| 9,049,756 B2 * | 6/2015 | Klusmann | H05B 47/18 |
| 9,095,015 B2 | 7/2015 | Welten | |
| 9,320,116 B2 | 4/2016 | Lydecker et al. | |
| 9,544,017 B2 * | 1/2017 | Fox | H04B 3/54 |

(Continued)

FOREIGN PATENT DOCUMENTS

EP   2018795   12/2016

*Primary Examiner* — Vibol Tan

(74) *Attorney, Agent, or Firm* — Kilpatrick Townsend & Stockton, LLP

(57) ABSTRACT

An intelligent lighting system may be installed using pre-existing electrical wiring, such as in a construction or retrofit environment. An intelligent lighting controller and an intelligent lighting fixture may be connected via electrical wiring that is configured for transmitting AC power signals. A commissioning signal may be transmitted to the intelligent lighting fixtures via the electrical wiring. In some cases, a power transmission circuit included in the intelligent lighting controller modifies portions of the AC power signal to indicate the commissioning signal. The power transmission circuit may modify the portions of the AC signal via passive components. The intelligent lighting fixtures may receive the commissioning signal via the electrical wiring. In some cases, each intelligent lighting fixture that is connected to the electrical wiring, such as each intelligent lighting fixture on a lighting circuit in a room, receives the commissioning signal.

22 Claims, 6 Drawing Sheets

(56) References Cited

U.S. PATENT DOCUMENTS

| | | | |
|---|---|---|---|
| 9,686,840 B2 | 6/2017 | Lydecker et al. | |
| 9,736,914 B2 * | 8/2017 | Pakkala | H05B 47/175 |
| 9,832,842 B2 | 11/2017 | Lydecker et al. | |
| 9,838,008 B2 * | 12/2017 | Lark, Jr. | H03K 17/962 |
| 9,883,564 B2 * | 1/2018 | Ciccarelli | H05B 47/11 |
| 9,887,053 B2 * | 2/2018 | Zulim | H01H 47/223 |
| 10,068,464 B2 | 9/2018 | Devlin | |
| 10,235,516 B2 | 3/2019 | Parello et al. | |
| 10,306,733 B2 * | 5/2019 | Chemel | H05B 47/105 |
| 10,334,682 B1 | 6/2019 | Hsu et al. | |
| 10,334,699 B2 | 6/2019 | Lydecker et al. | |
| 10,405,404 B1 * | 9/2019 | Trickler | H05B 47/18 |
| 10,638,570 B2 * | 4/2020 | Charlton | H05B 47/175 |
| 2012/0049749 A1 | 3/2012 | Pearlman et al. | |
| 2014/0265880 A1 | 9/2014 | Taipale et al. | |
| 2019/0313503 A1 | 10/2019 | Woytowitz | |

* cited by examiner

TRANSMISSION CIRCUIT FOR POWERLINE COMMISSIONING TECHNIQUES

TECHNICAL FIELD

This disclosure relates generally to the field of lighting fixtures, and more specifically relates to a power transmission circuit for commissioning of programmable lighting fixtures.

BACKGROUND

An intelligent lighting fixture may provide controllable lighting effects in an environment. For example, the intelligent lighting fixture may provide lighting effects such as dimming, color selection, correlated color temperature selection, timed lighting, multiple scenes, or other suitable lighting effects. In some cases, an intelligent lighting fixture is commissioned, such as by logically pairing the intelligent lighting fixture with an intelligent lighting controller. In some cases, the intelligent lighting fixture may require commissioning to perform one or more of the controllable lighting effects.

Commissioning an intelligent lighting fixture may include transmitting one or more communications between the intelligent lighting fixture and an intelligent lighting controller. In some cases, the commissioning communications identify which intelligent lighting fixtures are controlled by a particular intelligent lighting controller. Existing commissioning techniques may be initiated by depressing a button on the lighting device that is being commissioned. However, this technique may cause difficulties for a person who is performing the commissioning. For example, a lighting technician may need to move a ladder to each lighting fixture that is being commissioned, and to climb up and down the ladder multiple times in order to depress the button. In addition, existing commissioning techniques may require additional components, such as low-voltage wiring or power line communication ("PLC") transceivers, and the size, complexity, or installation of these components may increase the cost of these existing commissioning techniques.

Another existing commissioning technique may include transmitting a communication via radio frequency ("RF") signals. However, a lighting fixture that is in close proximity to an RF controller may be difficult to assign to a different controller, if the user wishes to assign the fixture to a different group or zone. In addition, an RF signal may be vulnerable to interference, in particular during the initial commissioning of an intelligent lighting fixture. The RF signal may be subject to accidental or malicious interference, resulting in the commissioning being error-prone or vulnerable to an attack by a malicious actor.

It is desirable to develop commissioning techniques that are simple for a person to perform, without requiring movement between lighting fixtures, and without requiring physical contact with or visible feedback from the lighting fixtures being commissioned. It is also desirable to develop commissioning techniques that do not require installation of additional wires or other components. It is also desirable to develop commissioning techniques that are resilient against interference.

SUMMARY

According to certain implementations, an intelligent lighting controller and an intelligent lighting fixture are connected via high-voltage electrical wiring. The electrical wiring may be configured for transmitting alternating current ("AC") power signals. The intelligent lighting controller includes a microprocessor configured to generate a commissioning signal, and a power transmission circuit including a parallel arrangement of a diode and a relay. The power transmission circuit comprises a power input provided to the diode and a contact of the relay, the power input being configured to receive a power signal having an AC waveform. The power transmission circuit comprises a control input that is configured to receive the commissioning signal.

The power transmission circuit is configured to provide the power signal to an intelligent lighting fixture during a closed state of the contact. The power transmission circuit is further configured to activate an open state of the contact responsive to receiving the commissioning signal. The power transmission circuit is further configured to provide a modified power signal, during the open state of the contact, to the intelligent lighting fixture via an output of the diode. The modified power signal comprises the power signal having an omitted sequence of portions of the AC waveform, wherein the omitted sequence of portions indicates the commissioning signal. The intelligent lighting fixture is configured to enter a commissioning mode responsive to detecting the omitted sequence of portions of the AC waveform.

These illustrative implementations are mentioned not to limit or define the disclosure, but to provide examples to aid understanding thereof. Additional implementations are discussed in the Detailed Description, and further description is provided there.

BRIEF DESCRIPTION OF THE DRAWINGS

Features, implementations, and advantages of the present disclosure are better understood when the following Detailed Description is read with reference to the accompanying drawings, where.

DETAILED DESCRIPTION

Figure 1:
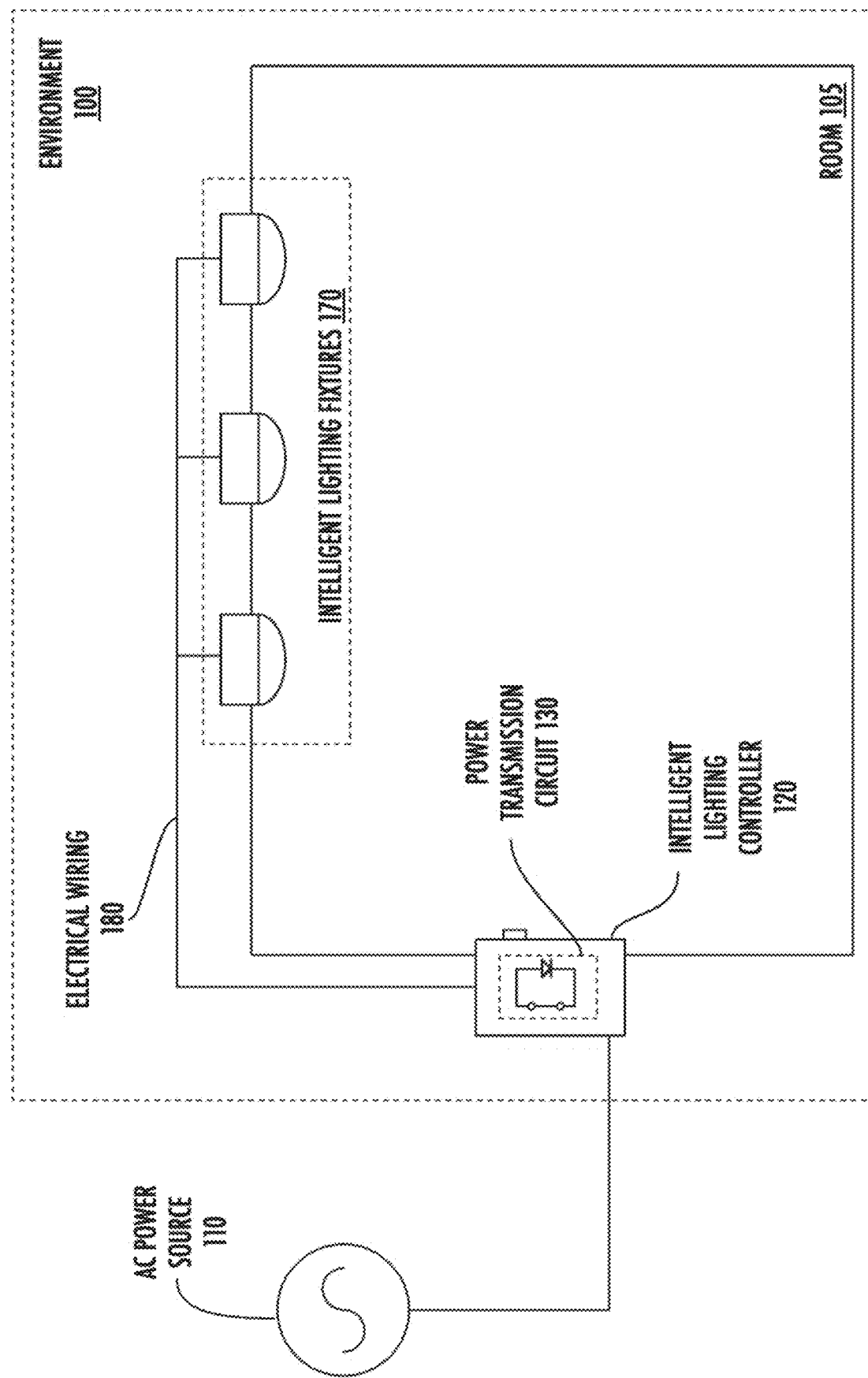
FIG. 1 is a block diagram depicting an example of an environment in which an intelligent lighting system is commissioned via powerline commissioning techniques, according to certain implementations.

As discussed above, prior commissioning techniques for intelligent lighting fixtures do not provide a commissioning process that is both secure and physically simple to perform. Certain implementations described herein provide for a power transmission circuit that includes one or more passive electrical components configured to provide a commissioning signal via a powerline that is received by a lighting fixture. In some cases, the power transmission circuit that includes the passive components may perform powerline commissioning techniques with improved efficiency as compared to powerline commissioning techniques that are performed via active electrical components. For example, the power transmission circuit that includes one or more passive electrical components may require less energy, as compared to powerline commissioning techniques performed via active electrical components. In addition, the power transmission circuit that includes one or more passive electrical components may be simpler and/or cheaper to manufacture, as compared to powerline commissioning techniques performed via active electrical components.

In some cases, powerline commissioning techniques may be initiated at an intelligent lighting controller, without requiring physical access to each intelligent lighting fixture. These techniques may improve speed and efficiency for performing the commissioning, as well as improving comfort for the technician, such as by eliminating or reducing a need to climb ladders, shift ceiling panels, or other physical steps to access or visually check each intelligent lighting fixture. In addition, the described powerline commissioning techniques may improve security for the commissioning process, such as by reducing or eliminating wireless signals that are transmitted to or from an uncommissioned intelligent lighting fixture. Security of an intelligent lighting system may be improved by eliminating wireless transmissions from an uncommissioned lighting fixture that is advertising its presence or availability to join an intelligent lighting system. For example, initiating commissioning via a powerline signaling technique may eliminate a scanning process of uncommissioned intelligent lighting fixtures, such as scanning for lighting fixtures via wireless transmissions. The described techniques may reduce errors resulting from a lighting fixture responding to an inappropriate wireless commissioning signal (e.g., transmitted from a different floor of a building). In addition, the described techniques may reduce opportunity for deliberate interference from an outside system, such as malicious interference from a party seeking to gain access to the intelligent lighting system.

The following examples are provided to introduce certain implementations of the present disclosure. An intelligent lighting system may be installed in an area, such as a room or other area with electrical lighting. The installation area may include an intelligent lighting controller that includes a power transmission circuit with one or more passive electrical components, such as a relay. The intelligent lighting controller may be connected to an intelligent lighting fixture via high-voltage electrical wiring that is configured for transmitting AC power signals. Power may be provided to the intelligent lighting fixtures via the power transmission circuit, such as via a relay. The electrical wiring may connect multiple intelligent lighting fixtures in the installation area, such as via a lighting circuit in the room.

In the example intelligent lighting system, a commissioning process may be initiated at the intelligent lighting controller, such as in response to an input (e.g., by a technician using the intelligent lighting controller). The intelligent lighting controller may modify the AC power signal via the power transmission circuit, such as by opening the relay and providing the modified AC power signal via a diode in the power transmission circuit. The AC power signal may be modified via the diode, such as by omission of a sequence of positive and/or negative portions of a waveform of the AC power signal. The sequence of omitted portions may indicate a commissioning signal. The commissioning signal may indicate a control relationship between the intelligent lighting controller and the intelligent lighting fixture, such that the intelligent lighting fixture responds to commands (e.g., commands received subsequent to the commissioning process) received from the intelligent lighting controller. The intelligent lighting fixture may receive the modified AC power signal via the electrical wiring. In addition, the intelligent lighting fixture may enter a commissioning mode responsive to determining that the omitted sequence of waveform portions indicates the commissioning signal. Subsequent to providing the modified AC power signal, the intelligent lighting controller may modify an additional portion of the AC power signal by omitting an additional sequence of portions of the waveform, such that the additional omitted sequence indicates a group of lighting fixtures. In some cases, the group of lighting fixtures may include a commissioned group of lighting fixtures. The intelligent lighting fixture may join the commissioned group responsive to receiving the additional omitted sequence of waveform portions. In addition, the group of lighting fixtures may include a secured network having one or more secured intelligent lighting fixtures (e.g., intelligent lighting fixtures having one or more security features to prevent unauthorized access to or configuration of the intelligent lighting fixtures). For example, the additional omitted sequence could include one or more of an identification or a password for the secured network. The intelligent lighting fixture may join the secured network responsive to receiving the additional omitted sequence of waveform portions. In some cases, responsive to receiving the commissioning signal via the electrical wiring, the intelligent lighting fixture transmits a verification signal via a wireless technique, such as to verify information in the commissioning signal.

In some implementations, the sequence of omitted portions of the modified AC power signal may indicate information in addition or alternative to a commissioning signal. For example, the sequence of omitted portions may indicate information related to a configuration of an intelligent lighting fixture (e.g., configuration within a network of intelligent lighting fixtures), information indicating an emergency mode (e.g., a control signal from a security system, a signal indicating loss of communications with a central control panel), information indicating an output of the intelligent lighting fixture, or other suitable types of information.

Referring now to the drawings, FIG. 1 is a diagram depicting an example of an environment 100 in which an intelligent lighting system may be commissioned via powerline commissioning techniques. In the environment 100, one or more intelligent lighting fixtures, such as a plurality of intelligent lighting fixtures 170, and at least one intelligent lighting controller, such as the intelligent lighting controller 120, are installed in an area of the environment 100. In FIG. 1, the installation area is depicted as a room 105, but other implementations are possible. For example, the installation area may include an interior area of a building (e.g., rooms, hallways, maintenance areas), an exterior area (e.g., entryways, accent lighting), areas that are not associated with a building (e.g., parking lots, gardens), or any other suitable area (or combination of areas) in which an intelligent lighting system may be installed.

Each of the intelligent lighting fixtures 170 may be capable of providing programmable lighting effects.

Examples of programmable lighting effects include (without limitation) dimming, color selection, correlated color selection, timed lighting, multiple scenes, or other suitable programmable lighting effects. In some cases, programmable lighting effects include effects that are provided based on input from one or more sensors, (e.g., occupancy sensors, ambient light sensors, temperature sensors). In addition, the intelligent lighting controller 120 may be capable of providing instructions to one or more of the intelligent lighting fixtures 170. For example, the lighting controller 120 may provide to the lighting fixtures 170 digital instructions to provide a programmable lighting effect. In some cases, the intelligent lighting controller 120 is configured to receive instructions describing the one or more programmable lighting effects. For example, the lighting controller 120 may receive instructions from a component in an intelligent lighting system (e.g., a central control panel, a security system). In some cases, the lighting controller 120 may transmit some or all of the received instructions to the intelligent lighting fixtures 170.

In some cases, the environment 100 may have electrical wiring, such as electrical wiring 180. The electrical wiring 180 may provide an electrical pathway between the intelligent lighting controller 120 and the intelligent lighting fixtures 170. In some cases, the electrical wiring 180 is a conductor for an alternating current ("AC") power signal. For example, an AC power source 110 may provide the AC power signal to the lighting controller 120. The lighting controller 120 may include a power transmission circuit, such as a power transmission circuit 130. The power transmission circuit 130 may include one or more passive components, such as a relay and a diode in a parallel configuration, that provide an electrical pathway for the AC power signal from the AC power source 110 to the electrical wiring 180. The electrical wiring 180 may conduct the AC power signal between the lighting controller 120 and each of the lighting fixtures 170. In some cases, the AC power signal may be considered a high-voltage power signal having a voltage that is suitable for powering a residential or business facility (e.g., 120 V, 240 V, 277 V, 347 V).

In some implementations, the environment 100 is a retrofit environment, such as an installation area in which light fixtures and light switches are replaced with an intelligent lighting system. For example, one or more of the intelligent lighting fixtures 170 may replace a previous lighting fixture that is incapable of providing a programmable lighting effect. In addition, the intelligent lighting controller 120 may replace a previous lighting switch that is incapable of providing digital instructions to a lighting fixture. In the example retrofit environment, the electrical wiring 180 may include legacy wiring, such as wiring present in the walls of the room 105 prior to replacement of a lighting fixture or lighting switch. The electrical wiring 180 may connect each lighting fixture on a lighting circuit in the room 105, such as a legacy lighting circuit that connects previous lighting fixtures (e.g., replaced by the intelligent lighting fixtures 170) to a previous light switch (e.g., replaced by the intelligent lighting controller 120).

In some implementations, a commissioning process may be performed for the intelligent lighting fixtures 170. The commissioning process may include transmission of one or more commissioning signals to the intelligent lighting fixtures 170 from the intelligent lighting controller 120. The commissioning signals may indicate an association between the intelligent lighting fixtures 170 and the intelligent lighting controller 120, such as an association (e.g., a control relationship) that assigns the intelligent lighting fixtures 170 to a commissioned group that is controlled by digital instructions received from the intelligent lighting controller 120. Responsive to receiving the commissioning signals, each of the lighting fixtures in the intelligent lighting fixtures 170 may perform one or more operations related to joining the commissioned group for the intelligent lighting controller 120. Subsequent to joining the commissioned group, the intelligent lighting fixtures 170 may provide programmable lighting effects based on digital instructions received from the intelligent lighting controller 120.

As used herein, the term "group" refers to one or more intelligent lighting fixtures that are configured to provide programmable lighting effects based on digital instructions received from a particular intelligent lighting controller that is associated with the group of fixtures. Commissioned groups of intelligent lighting fixtures may provide an understandable way (e.g., readily understood by a technician or user of the lighting system) to distribute digital instructions to collections of fixtures. For example, an intelligent lighting fixture within a group may respond to group instructions (e.g., an instruction indicating "power on" for all group fixtures). In addition, an intelligent lighting fixture within a group may be assigned to one or more zones (e.g., subgroups), and may respond to zone instructions (e.g., an instruction indicating "dim to 50%" for all fixtures in a zone). In some cases, a particular intelligent lighting fixture that is included in a commissioned group may disregard instructions received from another intelligent lighting controller that is unassociated with the particular fixture's group. For example, if the particular lighting fixture is capable of receiving instructions that are broadcast to multiple commissioned groups (e.g., wireless broadcast, wired broadcast), the particular lighting fixture may disregard the broadcast instructions responsive to determining that the broadcast instructions are not associated with the particular fixture's group.

In the environment 100, one or more commissioning signals for the intelligent lighting fixtures 170 may be transmitted via the electrical wiring 180. For example, the intelligent lighting controller 120 may provide an AC power signal received from the AC power source 110. The AC power signal may be provided via the power transmission circuit 130, such as via a closed relay in the circuit 130. The intelligent lighting controller 120 may modify the AC power signal via the power transmission circuit 130, such as by opening the relay in the relay in the circuit 130 and providing the modified AC power signal via the diode in the circuit 130. The modification may include omitting a portion, or multiple portions, of the waveform of the AC power signal, such as portions that are omitted via a reverse bias of the diode in the power transmission circuit 130. In FIG. 1, for example, the diode depicted in the power transmission circuit 130 may provide a negative portion of the waveform and omit a positive portion of the waveform, but other configurations are possible. For instance, a power transmission circuit may include a diode configured to omit a negative portion of the waveform and provide a positive portion of the waveform, or multiple diodes configured to provide or omit a combination of positive and/or negative portions of the waveform.

In some cases, the omitted portions may represent a commissioning signal. The commissioning signal may indicate a control relationship between the intelligent lighting controller and the intelligent lighting fixture, such that the intelligent lighting fixture responds to digital instructions received from the intelligent lighting controller subsequent to the commissioning process. The intelligent lighting controller 120 may transmit the modified waveform to each of the intelligent lighting fixtures 170 that are configured to receive power via the wiring 180. In some implementations, the commissioning signal may be transmitted via a first communication channel that includes the electrical wiring 180. Responsive to receiving the modified power signal, each of the intelligent lighting fixtures 170 may perform one or more operations related to commissioning, such as entering a commissioning mode or joining a commissioned group. The commissioning signal may be received by each lighting fixture that is connected via electrical wiring 180, such as each lighting fixture connected via the legacy lighting circuit in the room 105.

In some cases, a commissioning process in the environment 100 may include multiple modifications to a power signal. For example, the intelligent lighting controller 120 may perform a first modification of the AC power signal. The first modification may include omitting a first portion, or sequence of portions, of the AC power signal. Each of the intelligent lighting fixtures 170 may receive the AC power signal with the first modification via the electrical wiring 180. Responsive to determining that the AC power signal has the first modification, the intelligent lighting fixtures 170 may perform one or more operations related to commissioning. For example, one or more of the intelligent lighting fixtures 170 may enter a commissioning mode, in which a respective intelligent lighting fixture is configured to modify its respective commissioned group. In some cases, an intelligent lighting fixture that has entered commissioning mode may perform one or more additional operations related to entering the mode, such as emitting light at a predetermined level (e.g., terminating a programmed dimming or color lighting effect), providing a visual indication of the mode (e.g., flashing a light emitter, illuminating an indicator LED), or other suitable operations related to entering a commissioning mode.

In addition, the intelligent lighting controller 120 may perform a second modification of the AC power signal. The second modification may include omitting a second portion, or sequence of portions, of the AC power signal. The first and second modification may, but need not, have a similar pattern of omitted waveform portions. Each of the intelligent lighting fixtures 170 may receive the AC power signal with the second modification via the electrical wiring 180. Responsive to determining that the AC power signal has the second modification, the intelligent lighting fixtures 170 may perform one or more additional operations related to commissioning. For example, each of the intelligent lighting fixtures 170 may identify, based on the second modification, a commissioned group that is associated with the intelligent lighting controller 120. In addition, one or more of the intelligent lighting fixtures 170 may modify its respective commissioned group, such as by joining the identified commissioned group associated with the intelligent lighting controller 120. In some cases, an intelligent lighting fixture that has identified the commissioned group may perform one or more additional operations related to modifying a commissioned group, such as performing a security check or other verification of the modification. In some cases, the verification may include one or more signals that are transmitted via a second communication channel that is different from the first communication channel. For example, the first or second modifications of the AC power signal may be transmitted via the first communication channel that includes the power transmission circuit 130 and the electrical wiring 180. The verification may be transmitted via the second communication channel, such as a wireless or wired communication channel that excludes the power transmission circuit 130 and the electrical wiring 180. The verification may be a wireless verification transmission that is provided to or received from the intelligent lighting controller 120.

In some implementations, commissioning signals transmitted via the electrical wiring 180 indicate a Level 1 commissioning, which assigns the intelligent lighting fixtures 170 to a group that is controlled by the intelligent lighting controller 120. In some cases, additional commissioning signals (or other control signals) that indicate a Level 2 commissioning, such as an effect configuration signal, are provided to the intelligent lighting fixtures 170. The Level 2 commissioning may configure behaviors or actions performed by the intelligent lighting fixtures 170, such as assignment to a particular zone (e.g., window lighting, desk lighting) or producing a particular lighting effect (e.g., dimming, nighttime mode). The Level 2 commissioning may indicate programmable lighting effects that are configured to be implemented based on input from one or more sensors, such as an effect configuration signal that indicates a lighting effect provided in response to an input from an occupancy sensor. In some implementations, the Level 2 commissioning may indicate a modification of a Level 1 commissioning. For example, the intelligent lighting controller 120 may send, to the lighting fixtures 170, a modified AC power signal that includes a Level 1 commissioning signal assigning the lighting fixtures 170 to a group associated with the controller 120. In addition, the intelligent lighting controller 120 may send, to a particular one of the lighting fixtures 170, a Level 2 commissioning signal that assigns the particular lighting fixture to an additional group. In some cases, the additional group does not include the controller 120. Subsequent to being assigned to the additional group, the particular lighting fixture may provide programmable lighting effects based on digital instructions received from an additional intelligent lighting controller in the additional group. In some cases, the particular lighting fixture may disregard instructions received from the intelligent lighting controller 120, such as if the additional group does not include the controller 120.

In some implementations, the Level 1 commissioning is indicated via one or more modifications to an AC power signal, such as the modified power signal transmitted via the power transmission circuit 130 and the electrical wiring 180. In addition, the Level 2 commissioning is indicated via one or more signals transmitted via an additional communication channel that does not include the power transmission circuit 130 and the electrical wiring 180, such as a wireless communication channel or low-voltage wiring. For example, the intelligent lighting controller 120 may send to the lighting fixtures 170 a modified AC power signal via the electrical wiring 180. The modified AC power signal may indicate a Level 1 commissioning signal, such that the lighting fixtures 170 enter a commissioning mode responsive to the modified AC power signal. Subsequently, the intelligent lighting controller 120 may send to the lighting fixtures 170 an effect configuration signal via an additional communication channel that excludes the electrical wiring 180. For example, the effect configuration signal may be sent wirelessly, such as via one or more antennas of the controller 120 or the fixtures 170, or via an additional wired channel, such as low-voltage wiring. The effect configuration signal may indicate a Level 2 commissioning signal, such that, based on digital instructions included in the effect configuration signal, the lighting fixtures 170 are configured to provide one or more programmable lighting effects.

In some implementations, security data may be transmitted via a modification of the AC power signal. For example, the intelligent lighting controller 120 may perform an additional modification of the AC power signal (such as, but not limited to, a modification indicating a verification check or a Level 2 commissioning). The additional modification may omit an additional portion, or sequence of portions, of the AC power signal. In addition, the additional modification may indicate security data, such as security data that is associated with the intelligent lighting controller 120, the group controlled by the controller 120, or both. In some cases, the security data may include one or more of information describing a secured communications network (e.g., an address, a login/password), a cryptographic key or key pair, or other information that is usable to secure communications between components in an intelligent lighting network. Each of the intelligent lighting fixtures 170 may receive the AC power signal with the additional modification via the electrical wiring 180. Responsive to determining that the AC power signal has the additional modification, the intelligent lighting fixtures 170 may transmit a communication that is secured using the indicated security data. For example, each of the intelligent lighting fixtures 170 may transmit, to the intelligent lighting controller 120, a secured communication, such as a secured communication that is encrypted using a cryptographic key indicated by the additional modification. In some cases, the secured communication is transmitted via an additional communication channel that excludes the electrical wiring 180. For example, the secured communication may be sent wirelessly, such as via one or more antennas of the controller 120 or the fixtures 170, or via an additional wired channel, such as low-voltage wiring.

Figure 2:
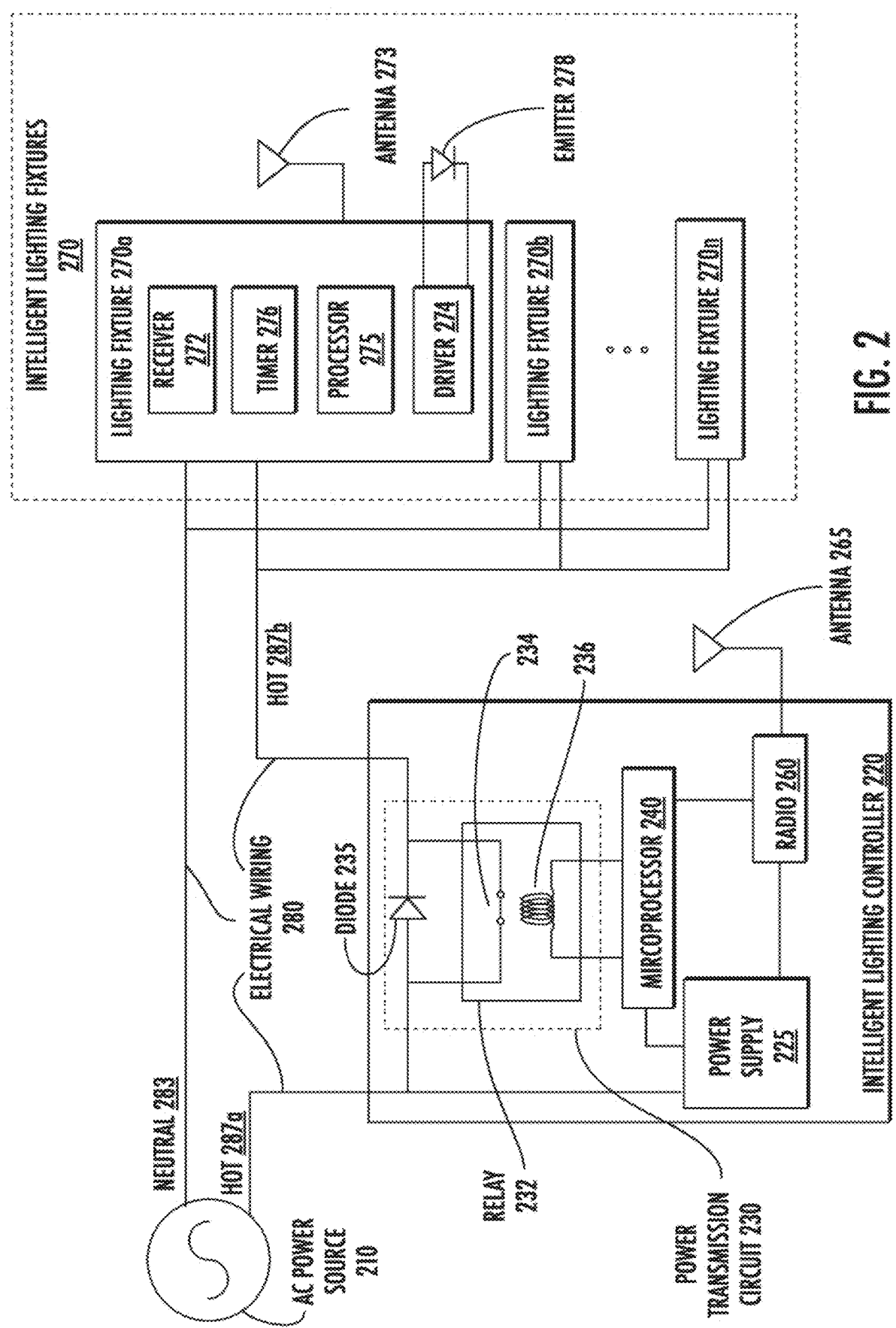
FIG. 2 is a diagram depicting an example of an intelligent lighting controller configured to commission a plurality of intelligent lighting fixtures via a power transmission circuit, according to certain implementations.

FIG. 2 is a diagram depicting an example implementation of an intelligent lighting controller 220 and a plurality of intelligent lighting fixtures 270 connected via electrical wiring 280. The intelligent lighting fixtures 270 may include multiple fixtures, such as an intelligent lighting fixture 270a, an intelligent lighting fixture 270b, through an intelligent lighting fixture 270n. The intelligent lighting controller 220, the intelligent lighting fixtures 270, and the electrical wiring 280 may be included in a retrofit environment or other installation area, such as the environment 100. In some cases, the electrical wiring 280 is legacy wiring.

The electrical wiring 280 may be configured to transmit high-voltage electrical power, such as an AC power signal received from an AC power source 210. The electrical wiring 280 may include a neutral line 283 that provides an electrical pathway between the AC power source 210 and the intelligent lighting fixtures 270. In some implementations, the neutral line 283 may be connected to the intelligent lighting controller 220, such that the neutral line 283 provides an electrical pathway between the AC power source 210 and the controller 220, and between the controller 220 and the intelligent lighting fixtures 270.

In addition, the electrical wiring 280 may include a hot line 287a that provides an electrical pathway between the AC power source 210 and the intelligent lighting controller 220, and a hot line 287b that provides an electrical pathway between the intelligent lighting controller 220 and the intelligent lighting fixtures 270. The hot lines 287a and 287b are collectively referred to herein as hot line 287. In some cases, the electrical wiring 280 may include an additional line that is designated as a ground line.

In FIG. 2, the intelligent lighting controller 220 includes a power transmission circuit 230 that is configured to transmit power that is transmitted on the hot line 287. The power transmission circuit 230 may include a relay 232 and a diode 235. The relay 232 may include one or more of a contact 234 and a coil 236. The contact 234 and coil 236 may be coupled, such that a state of the contact 234 (e.g., open, closed) is based on a state of the coil 234 (e.g., activated, deactivated). In addition, the intelligent lighting controller 220 may include one or more of a microprocessor 240, a radio 260, an antenna 265, and a power supply 225. In some cases, the intelligent lighting controller 220 may include one or more user interface components, such as a button, a touchscreen, a toggle, a slider, or any other suitable user interface component (or combination of components). In addition, the intelligent lighting controller 220 may include (or be configured to connect to) one or more sensors, such as an occupancy sensor, an ambient light sensor, or other suitable sensor types.

In some implementations, the relay 232 and the diode 235 may be arranged in an electrically parallel configuration. For example, the diode 235 and the contact 234 of the relay 230 may be arranged in parallel, such that a power signal received by a power input of the power transmission circuit 230 is provided to an input of the diode 235 and also to an input of the contact 234. The power transmission circuit 230 may also include a control input, such that a control signal (e.g., a commissioning signal) received from the microprocessor 240 is received by an input of the coil 236. In some cases, the contact 234 may have an open state or a closed state, responsive to an activation or deactivation of the coil 236 by the received control signal. In FIG. 2, the relay 232 is depicted as a normally closed relay (e.g., the contact 234 is closed when no activation control signal is received, and open when an activation control signal is received), but other configurations are possible. For example, a power transmission circuit may include one or more relays that are normally closed, normally open, mechanically latching, or other suitable relay types.

In some cases, the power transmission circuit 230 may be configured to allow or prevent transmission of the AC power signal transmitted on the hot line 287. In some implementations, the power transmission circuit 230 may modify the AC power signal that is received on the hot line 287a, such as the AC power signal provided to the diode 235 and the contact 234. In addition, the power transmission circuit 230 may transmit the modified power signal on the hot line 287b, such as the modified power signal provided via a power output from one or more of the diode 235 or the contact 234. In some cases, the modification to the power signal is based on an indication received from the microprocessor 240, such as a control signal received by the coil 236. The control signal may indicate activation of the coil 236 and/or the contact 234. In some cases, the control signal may include a commissioning signal, such as an instruction for an intelligent lighting fixture to enter a commissioning mode. The microprocessor 240 may provide the control signal responsive to an input to the intelligent lighting controller 220, such as an input received via the radio 260, or via a user interface component of the intelligent lighting controller 220, or via another suitable input technique.

In some cases, the control signal indicates the modification for the power signal, such as a control signal indicating portions of the power signal that are to be omitted. Based on the control signal or other indication from the microprocessor 240, the power transmission circuit 230 modifies one or more portions of the waveform for the AC power signal received via the hot line 287a. For example, responsive to the control signal, the coil 236 activates an open state of the contact 234, such that the AC power signal on the hot line 287a is received by the diode 235, and the modified AC power signal is provided by the diode on the hot line 287b. During the open state of the contact 234, the diode 235 provides the modified AC power signal by omitting one or more portions of the waveform. In FIG. 2, the diode 235 is configured to provide a positive portion of the waveform and omit a negative portion of the waveform, but other configurations are possible. In some cases, the modified waveform includes a sequence of omitted waveform portions. In addition, the omitted sequence may indicate the commissioning signal. The modified waveform may be transmitted to the intelligent lighting fixtures 270 via the hot line 287b.

In some cases, each of the intelligent lighting fixtures 270 determines that the AC power signal received via the line 287b includes a modification. For example, a receiver 272 included in the lighting fixture 270a monitors the AC power signal present on the line 287b. Based on the monitoring, the receiver 272 may detect that the AC power signal is modified to omit a waveform portion. In addition, the receiver 272 may provide an indication of the omitted portion, such as to one or more of a microprocessor 275 or a timer 276. The timer 276 may determine a duration of the omitted portion of the waveform, and provide an indication of the duration to the microprocessor 275. In addition, the timer 276 or the microprocessor 275 may determine a zero crossing (e.g., a point in time when the signal voltage is about 0 V) of the AC power signal. Based on the duration, the zero crossing, or both, the processor 275 may determine a sequence of omitted portions of the waveform. For instance, if the timer 276 indicates that the AC power signal is omitted for 8.3 ms subsequent to a zero crossing the processor 275 may determine that one half of a waveform is omitted. In addition, if the timer 276 indicates that the AC power signal is omitted for 16.6 ms subsequent to a zero crossing the processor 275 may determine that one complete waveform is omitted.

Based on the duration (or durations) of one or more omitted waveform portions, the microprocessor 275 may determine that the sequence indicates the commissioning signal. Responsive to determining that the modified AC power signal indicates the commissioning signal, the processor 275 performs an operation related to commissioning, such as entering a commissioning mode. While operating in the commissioning mode, the processor 275 may perform one or more additional operations, such as providing a command to a lighting driver 274, which may adjust a power current supplied to a lighting emitter 278. Each of the fixtures 270a through 270n may receive the modified power signal via the line 287b. In addition, each of the fixtures 270a through 270n may respond to the commissioning signal, such as by entering commissioning mode.

In some implementations, the power transmission circuit 230 may apply additional modifications to additional portions of the AC power signal received on the line 287a. For example, subsequent to modifying the AC power signal to indicate the commissioning signal, the power transmission circuit 230 may receive from the microprocessor 240 an additional control signal (or other indication) that indicates an additional commissioning signal. For example, the additional commissioning signal may indicate one or more of an identification of the intelligent lighting controller 220, an identification of a commissioned group of intelligent lighting fixtures associated with the intelligent lighting controller 220, an identification or password (or both) for a secured network of intelligent lighting fixtures associated with the intelligent lighting controller 220, or other information related to commissioning. Based on the additional control signal, the power transmission circuit 230 modifies one or more portions of the AC waveform received via the line 287a, such as by omitting an additional sequence of waveform portions to indicate the additional commissioning signal. The additional modified waveform may be transmitted to the intelligent lighting fixtures 270 via the line 287b.

In the lighting fixture 270a, the receiver 272 may detect the additional modified waveform of the AC power signal. In addition, the receiver may provide an indication of the additional omitted sequence, such as to one or more of the timer 276 or the processor 275. The timer 276 may determine an additional duration of an additional omitted portion of the additional modified waveform. Based on the duration or durations of one or more additional omitted portions, the processor 275 determines an additional sequence indicating the additional commissioning signal. In addition, responsive to determining that the additional commissioning signal identifies the commissioned group of the intelligent lighting controller 220, the processor 275 performs one or more additional operation related to commissioning, such as modifying the commissioned group assigned to the fixture 270a. Each of the fixtures 270a through 270n may receive the additional modification of the power signal via the line 278b. In addition, each of the fixtures 270a through 270n may respond to the additional commissioning signal, such as by each modifying the respective commissioned group of the respective fixture.

In some implementations, the modified AC power signal and the additional modified AC power signal may be received by the lighting fixtures 270 via a first communication channel, such as a communication channel that includes the electrical wiring 280 and the power transmission circuit 230. In addition, an additional signal may be received by one or more of the lighting fixtures 270 via an additional communication channel, such as a wireless transmission or a low-voltage wiring system.

In some cases, one or more of the intelligent lighting fixtures 270 may perform additional operations related to modifying a respective commissioned group, such as verification operations. The verification operations may include transmission of one or more signals via an additional communication channel that does not include the electrical wiring 280 and the power transmission circuit 230. For example, responsive to determining that the power signal on line 287b may be modified to indicate the commissioning signal or the additional commissioning signal, the lighting fixture 270a may transmit a verification signal via an antenna 273. Although FIG. 2 depicts the fixture 270a as having an antenna 273, other implementations are possible, such as transmission of a verification signal via low-voltage wiring that is separate from the electrical wiring 280, via an optical transmission (e.g., infrared, visible light), via a power current modulation technique that omits the power transmission circuit 230, via a digital transmission, or via another suitable transmission technique that is separate from one or more of the electrical wiring 280 or the power transmission circuit 230. The verification signal may indicate that a commissioning signal has been received by the fixture 270. In addition, the verification signal may indicate the commissioned group identified by the commissioning signal. In some cases, the verification signal may be transmitted to the intelligent lighting controller 220. For example, the intelligent lighting controller 220 may receive the verification signal via the antenna 265. In addition, the verification signal may be transmitted to an additional component in an intelligent lighting system, such as a central control panel or an additional intelligent lighting controller. The lighting fixture 270a may receive a verification response via the antenna 273, such as a verification response transmitted by the intelligent lighting controller 220 via the antenna 265. In some cases, the lighting fixture 270a may modify its commissioned group responsive to receiving the verification response (e.g., subsequent to a confirmation of the commissioning signal or the commissioned group).

In some implementations, a power transmission circuit may include multiple diodes. The multiple diodes may be arranged in parallel with respective contacts of multiple relays, such that a modified AC power signal provided by the power transmission circuit may omit a positive portion and a negative portion of a waveform.

Figure 3:
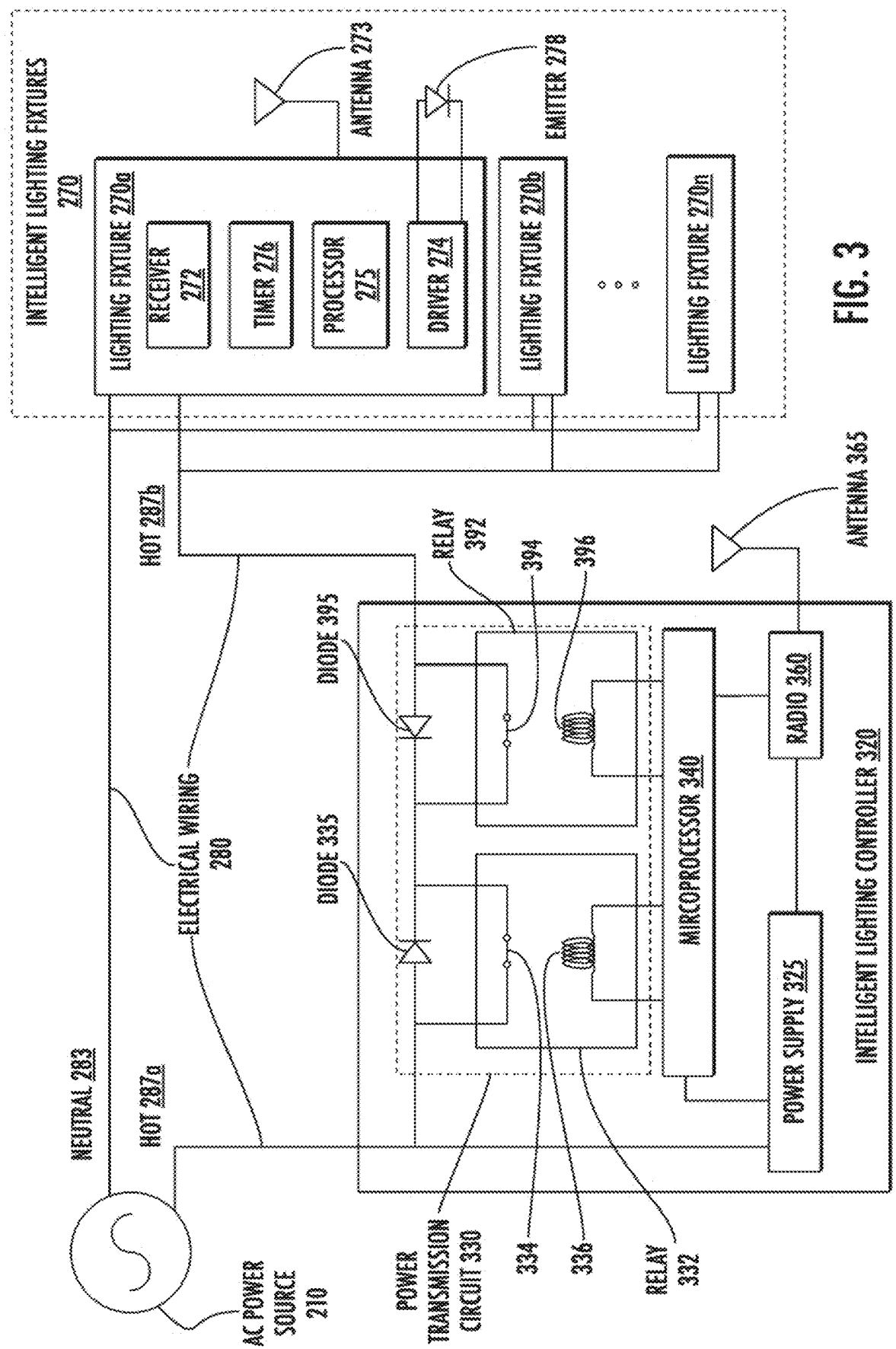
FIG. 3 is a diagram depicting an example of an intelligent lighting controller configured including a power transmission circuit having multiple parallel arrangements of diodes and relays, according to certain implementations.

FIG. 3 is a diagram depicting an example implementation of an intelligent lighting controller 320 that is connected with the intelligent lighting fixtures 270 via the electrical wiring 280. The intelligent lighting controller 320, the intelligent lighting fixtures 270, and the electrical wiring 280 may be included in a retrofit environment or other installation area, such as the environment 100. As described in regards to FIG. 2, the electrical wiring 280 may be configured to transmit an AC power signal received from the AC power source 210. The electrical wiring 280 may include the neutral line 283, the hot line 287a, and the hot line 287b. The hot line 287a may provide an electrical pathway between the AC power source 210 and the intelligent lighting controller 320, and the hot line 287b may provide an electrical pathway between the intelligent lighting controller 320 and the intelligent lighting fixtures 270.

In FIG. 3, the intelligent lighting controller 320 includes a power transmission circuit 330 that is configured to transmit power that is transmitted on the hot line 287. The power transmission circuit 330 may include multiple diodes arranged in parallel with respective contacts of multiple relays. For example, the power transmission circuit 330 may include a first diode 335 and a second diode 395. The power transmission circuit 330 may also include a first relay 332 and a second relay 392, the first relay 332 having a first contact 334 and a first coil 336, and the second relay 392 having a second contact 394 and a second coil 396. The first contact 334 and first coil 336 may be coupled, and the second contact 394 and second coil 396 may be coupled. In addition, the intelligent lighting controller 320 may include one or more of a microprocessor 340, a radio 360, an antenna 365, and a power supply 325. In some cases, the intelligent lighting controller 320 may include (or be configured to connect to) one or more user interface components, or one or more sensors.

In the power transmission circuit 330, the first diode 335 may be arranged in parallel with the first contact 334 and the second diode 395 may be arranged in parallel with the second contact 394. In addition, an output of the parallel arrangement of the first diode 335 and first contact 334 may be received by an input of the parallel arrangement of the second diode 395 and second contact 394. The first contact 334 may be responsive to the first coil 336, and the second contact 394 may be responsive to the second coil 396. In FIG. 3, the power transmission circuit 330 is depicted as having multiple relays 332 and 392, but other implementations are possible. For example, a power transmission circuit may include a particular relay device having multiple contacts that are responsive to one or more coils. In some cases, the particular relay device may include multiple relays that are incorporated as part of a single component (e.g., a surface-mount manufacturing package, a through-hole manufacturing package), or larger assembly. In addition, the relays 332 and 392 are depicted as single pole, single throw normally closed relays, but other implementations are possible, such as normally open, mechanically latching, multi-pole, multi-throw, or other suitable relay types.

The power transmission circuit 330 may also include one or more control inputs, such that a control signal (e.g., a commissioning signal) received from the microprocessor 340 is received by one or more of the first coil 336 or the second coil 396. In some cases, each of the coils 336 and 396 may have a respective input, such that the first coil 336 receives a first control signal and the second coil 396 receives a second control signal. In addition, each of the contacts 334 and 394 may respectively have an open state or a closed state, responsive to an activation or deactivation of the respective coils 336 and 396 based on the received control signals. FIG. 3 depicts the coils 336 and 396 as each having a respective input, but other implementations are possible. For example, the coils 336 and 396 may share a particular input, such that a particular control signal from the microprocessor 340 may be received by each of the coils 336 and 396.

In some cases, the power transmission circuit 330 may be configured to allow or prevent transmission of one or more waveform portions of the AC power signal on the hot line 287b, based on one or more control signals received from the microprocessor 340. In some implementations, the power transmission circuit 330 may modify the AC power signal that is received on the hot line 287a, such as the AC power signal provided to the diode 335 and the contact 334. In addition, the power transmission circuit 330 may transmit the modified power signal on the hot line 287b, such as the modified power signal provided via a power output from one or more of the diode 395 or the contact 394. In some cases, the modification to the power signal may be based on an indication received from the microprocessor 340, such as one or more control signals received by one or more of the coils 336 or 396. The control signals may indicate activation of one or more of the coils 336 and 396, and/or activation of one or more of the contacts 334 and 394. In some cases, the control signals may include a commissioning signal, such as an instruction for an intelligent lighting fixture to enter a commissioning mode. The microprocessor 340 may provide the control signals responsive to an input to the intelligent lighting controller 320.

In some cases, the one or more control signals indicate the modification for the power signal, such by indicating portions of the power signal that are to be omitted. Based on the control signals or other indication from the microprocessor 340, the power transmission circuit 330 may modify one or more portions of the waveform for the AC power signal received via the hot line 287a. In some implementations, the parallel arrangement of the first diode 335 and first contact 334 may provide a first modification to the AC power signal. For example, responsive to a first control signal, the first coil 336 may activate an open state of the first contact 334, such that the AC power signal on the hot line 287a is received by the first diode 335. During the open state of the first contact 334, the first diode 335 may provide a first modification to the AC power signal by omitting one or more portions of the waveform. In FIG. 3, the first diode 335 is configured to provide a positive portion of the waveform and omit a negative portion of the waveform, but other configurations are possible. During a closed state of the first contact 334 (e.g., the first control signal is not received; the first control signal indicates a deactivation of the contact 334), the AC power signal on the hot line 287a may be received by the first contact 334, and provided without the first modification to the parallel arrangement of the second diode 395 and second contact 394.

In addition, the AC power signal, including the first modification to the waveform, is provided by the parallel arrangement of the first diode 335 and first contact 334 to the parallel arrangement of the second diode 395 and second contact 394. If the AC power signal has the first modification (e.g., the AC power signal is provided via the first diode 335), the first modification is received by the parallel arrangement of the second diode 395 and second contact 394. If the AC power signal does not have first modification (e.g., the AC power signal is provided via the first contact 334), the AC power signal is received, without the first modification, by the parallel arrangement of the second diode 395 and second contact 394.

In some implementations, the parallel arrangement of the second diode 395 and second contact 394 may provide a second modification to the AC power signal. For example, responsive to a second control signal, the second coil 396 may activate an open state of the second contact 394, such that the AC power signal from the parallel arrangement of the first contact 334 and first diode 335 is received by the second diode 395. During the open state of the second contact 394, the second diode 395 may provide a second modification to the AC power signal by omitting one or more portions of the waveform. In FIG. 3, the second diode 395 is configured to omit a positive portion of the waveform and provide a negative portion of the waveform, but other configurations are possible. During a closed state of the second contact 394 (e.g., the second control signal is not received; the second control signal indicates a deactivation of the contact 394), the AC power signal may be received by the second contact 394, and provided without the second modification to the hot line 287b.

In FIG. 3, the AC power signal having one or more of the first or second modifications may be transmitted to the intelligent lighting fixtures 270 via the hot line 287b. In some cases, the combination of the first and second modifications includes a sequence of omitted waveform portions. In addition, the omitted sequence may indicate the commissioning signal. In some cases, each of the intelligent lighting fixtures 270 determines that the AC power signal received via the line 287b includes the modifications. Based on monitoring of the AC power signal, for example, the receiver 272 may detect that the AC power signal is modified to omit a waveform portion. In addition, the receiver 272 may provide an indication of the omitted portion to one or more of the microprocessor 275 or timer 276. The timer 276 may determine a duration of the omitted portion of the waveform, and provide an indication of the duration to the microprocessor 275. Based on the duration (or durations) of one or more omitted waveform portions, the microprocessor 275 may determine that the sequence indicates the commissioning signal. Responsive to determining that the modified AC power signal indicates the commissioning signal, the processor 275 performs an operation related to commissioning, such as entering a commissioning mode.

In some implementations, the power transmission circuit 330 may apply additional modifications to additional portions of the AC power signal received on the line 287a. For example, subsequent to modifying the AC power signal to indicate the commissioning signal, the power transmission circuit 330 may receive from the microprocessor 340 one or more additional control signals that indicate an additional commissioning signal, such as an additional commissioning signal indicating a commissioned group or a secured network. Based on the additional control signal, the power transmission circuit 330 modifies one or more portions of the AC waveform received via the line 287a, such as by omitting an additional sequence of waveform portions to indicate the additional commissioning signal The additional modified waveform may be transmitted to the intelligent lighting fixtures 270 via the line 287b.

In the lighting fixture 270a, the receiver 272 may detect the additional modified waveform of the AC power signal. Based on the duration or durations of one or more additional omitted portions, the processor 275 determines an additional sequence indicating the additional commissioning signal. In addition, responsive to determining that the additional commissioning signal identifies the commissioned group of the intelligent lighting controller 220, the processor 275 performs one or more additional operation related to commissioning.

In some implementations, the modified AC power signal and the additional modified AC power signal may be received by the lighting fixtures 270 via a first communication channel, such as a communication channel that includes the electrical wiring 280 and the power transmission circuit 330. In addition, an additional signal, such as an additional signal related to verification operations, may be transmitted by one or more of the lighting fixtures 270 or the intelligent lighting controller 320 via an additional communication channel. In some cases, the additional communication channel may exclude the electrical wiring 280 and the power transmission circuit 330.

In some implementations, a modified AC power signal may include a sequence of omitted portions of the power signal waveform. The sequence of omitted waveform portions may indicate, for example, a control signal received by a power transmission circuit in an intelligent lighting controller, such as the power transmission circuits 230 or 330. In some cases, the sequence of omitted waveform portions may include a pattern that indicates a commissioning signal. In addition, the sequence of omitted waveform portions may include a first pattern indicating a first bit and a second pattern indicating a second bit, such that the commissioning signal is indicated by a series of the first and second patterns. Additional patterns may be used, such as respective patterns indicating a high bit, a low bit, a start bit, or an end bit.

Figure 4:
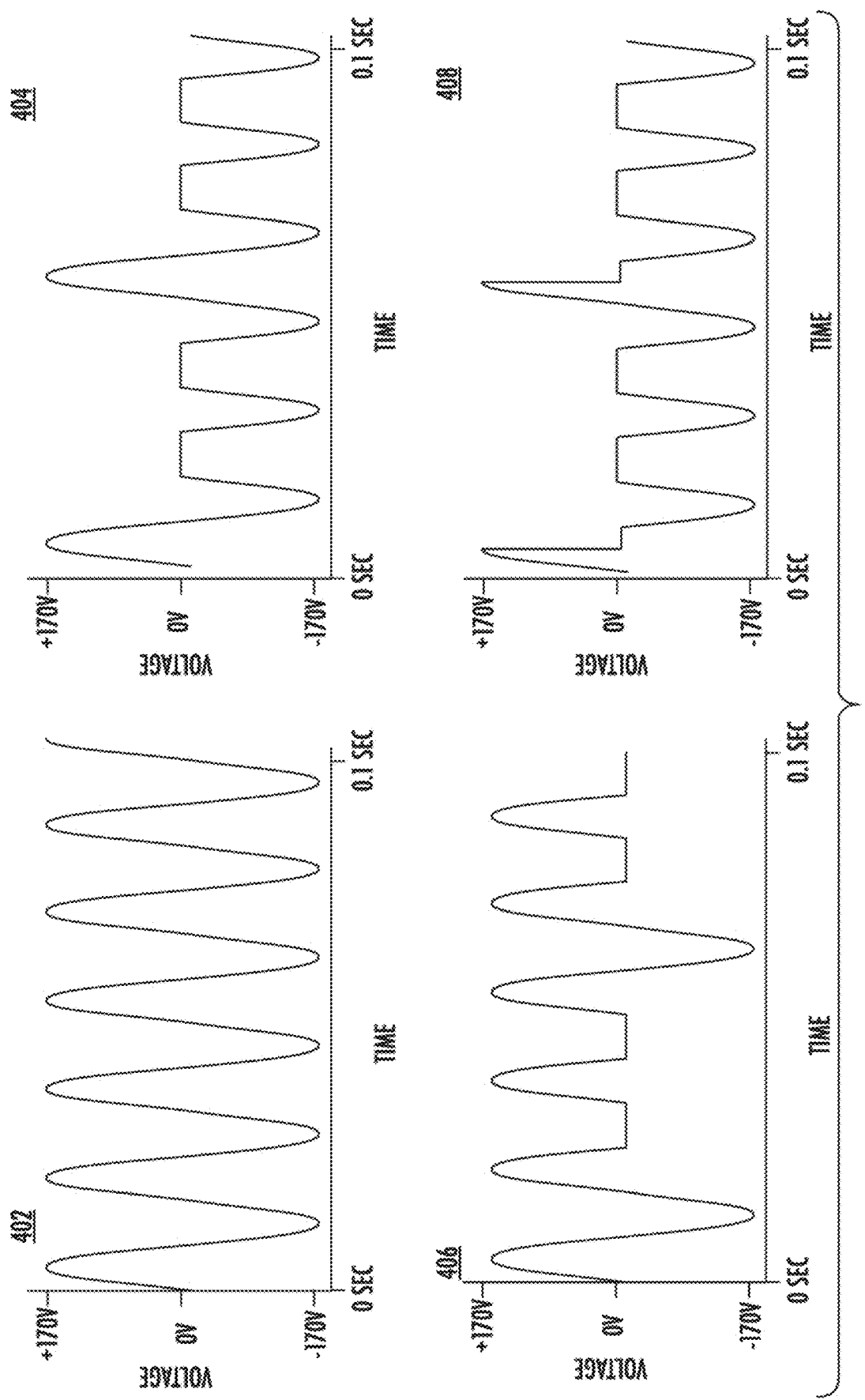
FIG. 4 is a diagram depicting examples of a sequence of omitted waveform portions, according to certain implementations.

FIG. 4 is a diagram depicting examples of a sequence of omitted waveform portions. The examples in FIG. 4 are non-limiting, and other sequences of omissions may be used without departing from the implementations and techniques described herein. The depicted waveforms 402, 404, 406, and 408 include example portions from an AC power signal having a peak-to-peak voltage of −170V to +170 V and a frequency of 60 Hz, but other implementations are possible, including other peak-to-peak voltages and other frequencies. The waveform 402 depicts an unmodified portion of the example AC power signal. The unmodified portion includes six complete (e.g., non-omitted) cycles having an amplitude from −170 V to +170 V, over a time duration from t=0 sec to t=0.1 sec.

The waveform 404 depicts an example of a sequence of omitted waveform portions. The waveform 404 includes a complete cycle having an amplitude from −170 V to +170 V, followed by two cycles having omitted positive portions (e.g., omitted from 0-170 V) and non-omitted negative portions (e.g., non-omitted from −170-0 V). The example sequence of a complete cycle followed by two cycles having omitted positive portions is repeated once in the waveform 404. The waveform 404 may be provided, for example, by a power transmission circuit having a diode that is configured to omit positive portions of a waveform, such as the example diode depicted in the power transmission circuit 130 of FIG. 1.

The waveform 406 depicts an additional example of a sequence of omitted waveform portions. The waveform 406 includes a complete cycle having an amplitude from −170 V to +170 V, followed by two cycles having non-omitted positive portions (e.g., non-omitted from 0-170 V) and omitted negative portions (e.g., omitted from −170-0 V). The example sequence of a complete cycle followed by two cycles having omitted positive portions is repeated once in the waveform 406. The waveform 406 may be provided, for example, by a power transmission circuit having a diode that is configured to omit negative portions of a waveform, such as the example diode depicted in the power transmission circuit 230 of FIG. 2.

The waveform 408 depicts an additional example of a sequence of omitted waveform portions. The waveform 408 includes a cycle having an omitted latter positive half, followed by two cycles having omitted positive portions and non-omitted negative portions. The example sequence of a cycle having an omitted latter positive half followed by two cycles having omitted positive portions is repeated once in the waveform 408. The waveform 408 may be provided, for example, by a power transmission circuit having multiple diodes that are configured to respectively omit positive or negative portions of a waveform, such as the example diodes depicted in the power transmission circuit 330 of FIG. 3.

In some cases, the example sequences depicted in waveforms 404, 406, and 408 may be used as patterns indicating bits. For example, one or more of the example sequences may indicate a start bit (e.g., a bit indicating a beginning of a sequence of bits). In addition, a single occurrence of an example sequence may indicate a high bit (or a low bit), and a double occurrence (or other multiple occurrence) of an example sequence may indicate a low bit (or a high bit). In some implementations, a modification to an AC power signal may include one or more of the example sequences, such that a commissioning signal is indicated by the included example sequences (e.g., a series of bits). The examples depicted in FIG. 4 are non-limiting, and other omitted (or non-omitted) sequences may be used without departing from the implementations and techniques described herein, such as omissions of half waves, full waves, partial waves, portions of positive waves, portions of negative waves, or any other omission or combination of omissions on an AC power signal.

Figure 5:
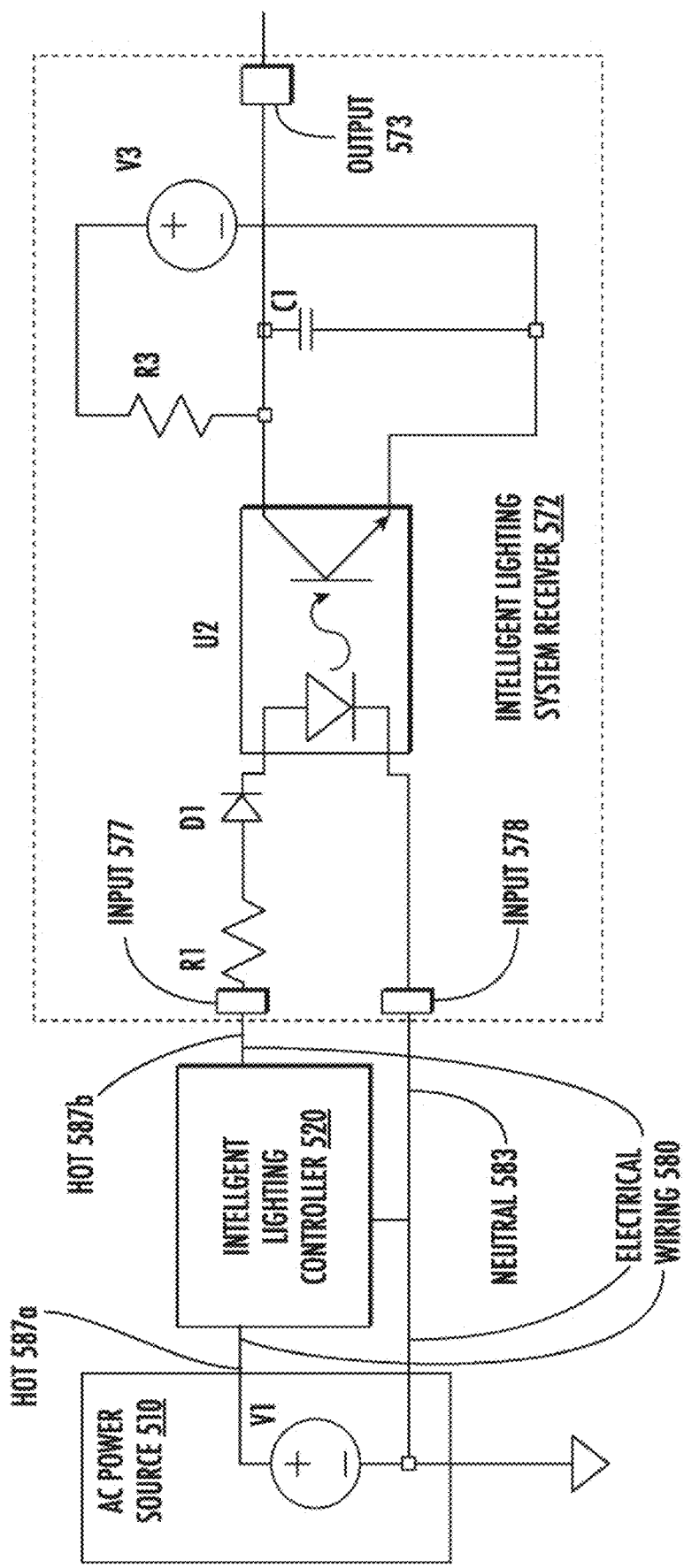
FIG. 5 is a diagram depicting an example configuration of electrical components that may be used to provide an output signal based on an amplitude of a received modified AC power signal, according to certain implementations.

In some implementations, an intelligent lighting controller includes one or more electrical components that are configured to modify an AC power signal. In addition, an intelligent lighting fixture includes one or more electrical components that are configured to determine a modification of a received AC power signal. FIG. 5 is a diagram depicting an example configuration of electrical components that may be used to receive a modified AC power signal. In FIG. 5, an AC power source 510, an intelligent lighting controller 520, and an intelligent lighting system receiver 572 are connected via electrical wiring 580. The intelligent lighting controller 520, the receiver 572, and the electrical wiring 580 may be included in a retrofit environment or other installation area, such as described in regards to FIGS. 1 and 2. In some cases, the electrical wiring 580 is legacy wiring. The receiver 572 may be included in a component of an intelligent lighting system, such as an intelligent lighting fixture, an intelligent sensor, an intelligent lighting driver, or another intelligent lighting component.

The electrical wiring 580 may be configured to transmit high-voltage electrical power, such as an AC power signal received from the AC power source 510. The electrical wiring 580 may include a neutral line 583 that provides an electrical pathway between the AC power source 510, the intelligent lighting controller 520, and the receiver 572. In addition, the electrical wiring 580 may include a hot line 587*a* that provides an electrical pathway between the AC power source 510 and the intelligent lighting controller 520, and a hot line 587*b* that provides an electrical pathway between the intelligent lighting controller 520 and the receiver 572. The hot lines 587*a* and 587*b* are collectively referred to herein as hot line 587. In some cases, the electrical wiring 580 may include an additional line that is designated as a ground line.

The AC power source 510 may include at least one voltage source, such as a voltage source V1, that is configured to provide an AC power signal via the hot and neutral lines 587 and 583. The AC power signal may be transmitted to a power transmission circuit that is included in the intelligent lighting controller 520, such as a power transmission circuit that includes one or more passive components. For example, a parallel configuration of a relay and a diode may omit the waveform portions in a sequence corresponding to a commissioning signal, such as described in regards to FIGS. 2 and 3.

In some implementations, the modified AC power signal may be received by the receiver 572 via line 587*b*. The receiver 572 may include one or more electrical components configured to monitor the power signal on line 587*b* for modifications. For example, the receiver 572 may include an input 577 and an input 578 that are configured to receive an AC power signal. For example, the hot line 587*b* may be connected at the input 577 and the neutral line 573 may be connected at the input 578. In addition, the receiver 572 may include one or more sensors that are configured to monitor an amplitude of the received AC power signal, such as an optocoupler U2. In some cases, an input to the optocoupler U2 may be connected to one or more additional components, such as a resistor R1 in series connection with a diode D1. In some cases, the resistor R1 may have a value (e.g., about 220 kΩ) that is suitable to limit current received by the optocoupler U2. In addition, the diode D1 may provide current blocking at the input(s) of the optocoupler U2.

In some implementations, the optocoupler U2 may receive an AC power signal via one or more of the inputs 577 and 578. The received power signal may be a modified AC power signal, such as an AC signal modified by a power transmission circuit (e.g., as described in regards to FIGS. 2 and 3), or the received power signal may be an unmodified AC power signal (e.g., not modified by the intelligent lighting controller 520). The optocoupler U2 may be configured to provide an output based on an amplitude of the received power signal. For example, the optocoupler U2 may provide an output when the received power signal has an amplitude above a forward voltage level (e.g., about 1.5 V) of a photodiode included in the optocoupler. In addition, the optocoupler U2 may withhold the output when the received power signal has an amplitude below the forward voltage level (e.g., the received AC signal is negative or around 0V). For example, based on the AC power signal received by the receiver 572, the optocoupler U2 may provide the output when the AC power signal has an amplitude greater than 0 volts and withhold the output when the AC power signal has an amplitude around or below 0 volts. In FIG. 5, the diode D1 and the optocoupler U2 are configured to provide an output responsive to a positive received power signal (e.g., a positive portion of the AC signal), but other implementations are possible, such as an optocoupler and diode that are configured with reverse polarity to provide an output responsive to a negative received power signal (e.g., a negative portion of the AC signal).

In some cases, an output of the receiver 572 may be based on the output of the optocoupler U2. For example, the receiver 572 may include a digital voltage source V3 that is connected between a collector and an emitter of a photodetector included in the optocoupler U2. In some cases, the digital voltage source V3 may be connected to one or more additional components, such as one or more of a series connection to a resistor R3 or a parallel connection to a capacitor C1. In some cases, the resistor R3 and the capacitor C1 may have respective values (e.g., about 47 kΩ, about 0.1 g) that are suitable to provide a output voltage at an output 573 of the receiver 572.

Responsive to the output of the optocoupler U2 (e.g., the received power signal has an amplitude above the forward voltage level), the receiver 572 may provide a first voltage level at the output 573, such as a voltage level of about 0 V. In addition, responsive to the optocoupler U2 withholding the output (e.g., the received power signal has an amplitude below the forward voltage level), the receiver 572 may provide a second voltage level at the output 573, such as a voltage level of about 3.3 V, 5 V, or any other suitable low-voltage digital level. Based on an AC waveform of the received power signal, the receiver 572 may provide an output signal indicating positive or non-positive portions of the waveform. For example, the receiver 572 may provide, to an intelligent lighting system component, an output signal indicating omitted portions of the AC waveform. Based on a pattern of the omitted portions indicated by the receiver 572, such as a pattern indicating a commissioning signal, the intelligent lighting system component may perform an operation, such as an operation related to commissioning. In some implementations, the intelligent lighting system component may be an intelligent lighting fixture that includes the receiver 572, but other implementations are possible, such as the intelligent lighting system component including an additional controller that provides a signal to one or more lighting fixtures.

Figure 6:
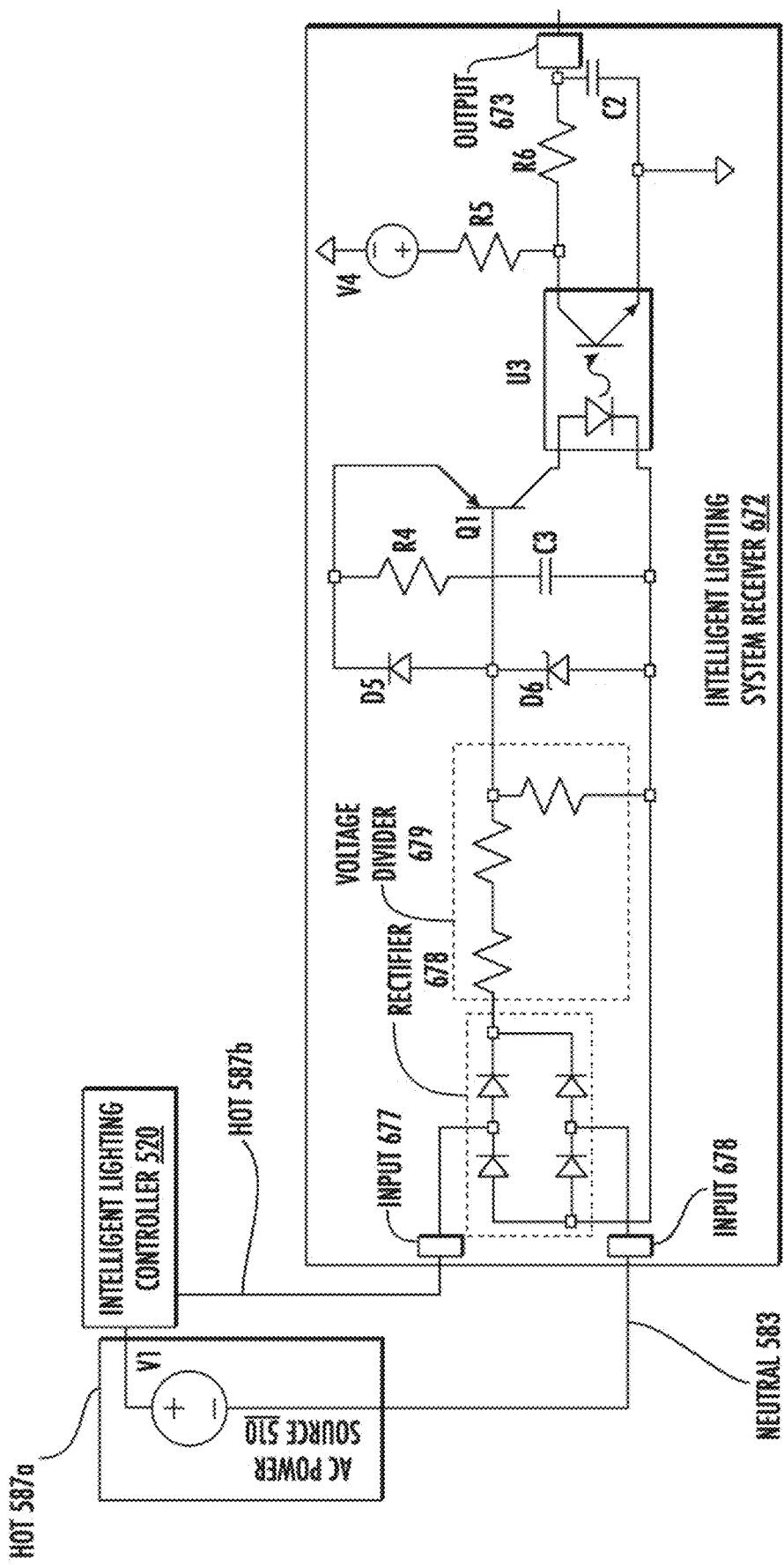
FIG. 6 is a diagram depicting an example configuration of electrical components that may be used to provide an output signal based on zero crossings of a received modified AC power signal, according to certain implementations.

FIG. 6 is a diagram depicting an additional example configuration of electrical components that may be used to receive a modified AC power signal. In FIG. 6 an intelligent lighting system receiver 672 is connected to the intelligent lighting controller 520 and the voltage source V1 included in the AC power source 510, such as described in regards to FIG. 5. In FIG. 6, the neutral line 583 may provide an electrical pathway between the voltage source V1, the intelligent lighting controller 520, and the receiver 672, and the hot line 587b may provide an electrical pathway between the intelligent lighting controller 520 and the receiver 672.

In some implementations, the receiver 672 may include an input 677 and an input 678 that are configured to receive an AC power signal. For example, the hot line 587b may be connected at the input 677 and the neutral line 583 may be connected at the input 678. The receiver 672 may include a rectifier 678 that is configured to adjust a negative voltage value of the received power signal to a positive voltage value. In addition, the receiver 672 may include a voltage divider 679 that is configured to reduce an amplitude of the received power signal.

The receiver 672 may include one or more sensors that are configured to monitor the received AC power signal for zero crossings, such as an optocoupler U3. In some cases, an input to the optocoupler U3 may be connected to one or more additional components, such as one or more of a bipolar junction transistor ("BJT") Q1, a resistor R4, a capacitor C3, or one or more diodes D5 and D6. In FIG. 6, the resistor R4 may have a value (e.g., about 100Ω) that is suitable to limit current received by the optocoupler U3. In addition, the capacitor C3 may have a value (e.g., about 0.33 μF) that is suitable to store energy from the received power signal, such as energy sampled from the output of voltage divider 679. The energy stored by capacitor C3 may be released through the optocoupler U3, BJT Q1, and resistor R4 when the amplitude of the sampled signal is less than a bias voltage (e.g., about 14.3 V) on the base of the BJT Q1. In addition, the diode D5 may provide current blocking at the input(s) of the optocoupler U3 and/or BJT Q1. In some cases, the diode D6 is a Zener diode, and may provide voltage stabilization, such as by clamping the voltage at the base of BJT Q1.

In some implementations, the optocoupler U3 may receive the energy released by capacitor C3, such as when the amplitude of the sampled signal is less than the bias voltage on BJT Q1. The sampled signal may be based on a modified AC power signal, such as an AC signal modified by a power transmission circuit (e.g., as described in regards to FIGS. 2 and 3), or the received power signal may be an unmodified AC power signal (e.g., not modified by the intelligent lighting controller 520). The optocoupler U3 may be configured to provide an output based on the released energy. For example, the optocoupler U3 may provide an output when the base voltage on Q1 is lower than voltage across C3 by about 0.7 V. In addition, the optocoupler U3 may withhold the output when the base voltage on Q1 is lower than voltage across C3 (e.g., while C3 is charging). For example, based on the AC power signal received by the receiver 672, the optocoupler U3 may provide an output pulse when the AC power signal has a non-zero amplitude and withhold the output pulse when the AC power signal has a zero amplitude (e.g., a zero-cross pulse that is released at zero crossings of the AC waveform). In FIG. 6, the optocoupler U3 is configured to provide an output responsive to a positive received power signal (e.g., a positively rectified AC signal), but other implementations are possible, such as an optocoupler that is configured with reverse polarity to provide an output responsive to a negative received power signal (e.g., a negatively rectified AC signal).

In some cases, an output of the receiver 672 may be based on the output of the optocoupler U3. For example, the receiver 672 may include a digital voltage source V4 that is connected at a collector of a photodetector included in the optocoupler U3. In some cases, the digital voltage source V4 may be connected to one or more additional components, such as to a resistor R5. An additional resistor R6 may be connected between an output 673 of the receiver 672 and the collector of the photodetector in optocoupler U3. A capacitor C2 may be connected between the output 673 of the receiver 672 and an emitter of the photodetector in optocoupler U3. In some cases, the resistors R5 and R6 and the capacitor C2 may have respective values (e.g., about 10 kΩ, about 100Ω, about 10 nF) that are suitable to provide a output voltage at the output 673.

Responsive to the output of the optocoupler U3 (e.g., the AC power signal has a non-zero amplitude), the receiver 672 may provide a first voltage level at the output 673, such as a voltage level of about 0 V. In addition, responsive to the optocoupler U3 withholding the output (e.g., the AC power signal has a zero amplitude), the receiver 672 may provide a second voltage level at the output 673, such as a voltage level of about 3.3 V or 5 V (or another suitable low-voltage digital level). Based on a AC waveform of the AC power signal, the receiver 672 may provide an output signal indicating positive or non-positive portions of the waveform. For example, the receiver 672 may provide, to an intelligent lighting system component, an output signal indicating omitted portions of the AC waveform. Based on a pattern of the omitted portions indicated by the receiver 672, such as a pattern indicating a commissioning signal, the intelligent lighting system component may perform an operation, such as an operation related to commissioning.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific implementations thereof, it will be appreciated that those skilled in the art, upon attaining an understanding of the foregoing, may readily produce alterations to, variations of, and equivalents to such implementations. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for commissioning an intelligent lighting fixture, the method including operations comprising:
   receiving a power signal having an alternating current (AC) waveform,
   providing the power signal to a diode and to a contact of a relay, wherein the diode and the contact are arranged in parallel, and wherein during a closed state of the contact the power signal is provided via a first output of the relay;
   responsive to a control signal, activating an open state of the contact, wherein during the open state of the contact a modified power signal is provided via a second output of the diode, wherein:
      the modified power signal comprises the power signal having an omitted sequence of portions of the AC waveform, and
      the omitted sequence of portions indicates a commissioning signal for the intelligent lighting fixture; and
   providing the modified power signal to the intelligent lighting fixture, wherein the intelligent lighting fixture is configured to enter a commissioning mode responsive to detecting the omitted sequence of portions of the AC waveform.

2. The method of claim 1, further comprising:
   subsequent to providing the modified power signal to the intelligent lighting fixture and responsive to an additional control signal, providing an additional modified power signal via the second output of the diode,
   wherein the additional modified power signal comprises the power signal having an additional omitted sequence of portions of the AC waveform, the additional omitted sequence indicating a group of intelligent lighting fixtures, the group of intelligent lighting fixtures being one or more of a commissioned group of intelligent lighting fixtures or a secured network of intelligent lighting fixtures,
   wherein the intelligent lighting fixture is further configured to join the group of intelligent lighting fixtures responsive to detecting the additional omitted sequence.

3. The method of claim 1, further comprising:
   subsequent to providing the modified power signal to the intelligent lighting fixture, receiving a verification signal from the intelligent lighting fixture; and
   transmitting, to the intelligent lighting fixture and responsive to receiving the verification signal, a verification response.

4. The method of claim 1, wherein the intelligent lighting fixture is further configured to determine a quantity of cycles of the modified power signal, based on a duration of the omitted sequence of portions of the AC waveform.

5. The method of claim 1, further comprising:
   subsequent to providing the modified power signal to the intelligent lighting fixture, determining a loss of a communication channel with the intelligent lighting fixture; and
   responsive to determining the loss of the communication channel, providing an additional modified power signal comprising the power signal having an additional omitted sequence of portions of the AC waveform, the additional omitted sequence indicating a lighting condition, wherein the intelligent lighting fixture is further configured to provide the indicated lighting condition responsive to detecting the additional omitted sequence.

6. The method of claim 1, wherein the modified power signal is provided to the intelligent lighting fixture via an AC power input of the intelligent lighting fixture.

7. The method of claim 1, wherein, subsequent to the omitted sequence of portions of the AC waveform, the modified power signal includes an unmodified cycle of the AC waveform.

8. A lighting controller comprising:
a microprocessor configured to generate a commissioning signal for an intelligent lighting fixture; and
a power transmission circuit including a diode and a relay, the diode and the relay being arranged in parallel,
wherein the power transmission circuit comprises (i) a power input that is provided to the diode and to a contact of the relay, the power input configured to receive a power signal having an alternating current (AC) waveform, and (ii) a control input configured to receive the commissioning signal from the microprocessor,
wherein the power transmission circuit is configured to:
during a closed state of the contact, provide the power signal to the intelligent lighting fixture via an output of the relay,
responsive to receiving the commissioning signal, activate an open state of the contact, and
during the open state of the contact, provide a modified power signal to the intelligent lighting fixture via an output of the diode, wherein the modified power signal comprises the power signal having an omitted sequence of portions of the AC waveform, and the omitted sequence of portions indicates the commissioning signal,
wherein the intelligent lighting fixture is configured to enter a commissioning mode responsive to detecting the omitted sequence of portions of the AC waveform.

9. The lighting controller of claim 8, wherein the microprocessor is further configured to generate an additional commissioning signal for the intelligent lighting fixture, and
wherein the power transmission circuit is further configured to:
subsequent to providing the modified power signal to the intelligent lighting fixture and responsive to receiving the additional commissioning signal, provide an additional omitted sequence of portions of the AC waveform, the additional omitted sequence indicating a group of intelligent lighting fixtures, the group of intelligent lighting fixtures being one or more of a commissioned group of intelligent lighting fixtures or a secured network of intelligent lighting fixtures,
wherein the intelligent lighting fixture is further configured to join the group of intelligent lighting fixtures responsive to detecting the additional omitted sequence.

10. The lighting controller of claim 8, wherein the microprocessor is further configured to determine, subsequent to providing the modified power signal to the intelligent lighting fixture, a loss of a communication channel with the intelligent lighting fixture, and
wherein the power transmission circuit is further configured to:
responsive to the determining the loss of the communication channel, provide an additional modified power signal comprising the power signal having an additional omitted sequence of portions of the AC waveform, the additional omitted sequence indicating a lighting condition,
wherein the intelligent lighting fixture is further configured to provide the indicated lighting condition responsive to detecting the additional omitted sequence.

11. The lighting controller of claim 8, wherein the intelligent lighting fixture is further configured to determine a quantity of cycles of the modified power signal, based on a duration of the omitted sequence of portions of the AC waveform.

12. The lighting controller of claim 8, wherein the modified power signal is provided to the intelligent lighting fixture via an AC power input of the intelligent lighting fixture.

13. The lighting controller of claim 8, wherein the control input is an input of a coil of the relay, and wherein the commissioning signal is received by the coil.

14. A lighting controller comprising:
a microprocessor configured to generate a commissioning signal for a intelligent lighting fixture; and
a power transmission circuit including a first diode, a first relay, a second diode, and a second relay, wherein the first diode and the first relay are arranged in parallel, and the second diode and the second relay are arranged in parallel,
wherein the power transmission circuit comprises (i) a power input that is provided to the first diode and to the first relay, the power input configured to receive a power signal having an alternating current (AC) waveform, and (ii) a control input configured to receive the commissioning signal from the microprocessor,
wherein the power transmission circuit is configured to:
during a closed state of the first relay and the second relay, provide the power signal to the intelligent lighting fixture via an output of the second relay,
responsive to receiving the commissioning signal, activate an open state of at least one of the first relay and the second relay, and
during the open state, provide a modified power signal to the intelligent lighting fixture via an output of the second diode, wherein the modified power signal comprises the power signal having an omitted sequence of portions of the AC waveform, and the omitted sequence of portions indicates the commissioning signal,
wherein the intelligent lighting fixture is configured to enter a commissioning mode responsive to detecting the omitted sequence of portions of the AC waveform.

15. The lighting controller of claim 14, wherein the control input is an input of one or more of (i) a first coil of the first relay or (ii) a second coil of the second relay, and wherein the commissioning signal is received by one or more of the first coil or the second coil.

16. The lighting controller of claim 14, wherein the microprocessor is further configured to generate an additional commissioning signal for the intelligent lighting fixture, and
wherein the power transmission circuit is further configured to:
subsequent to providing the modified power signal to the intelligent lighting fixture and responsive to receiving the additional commissioning signal, provide an additional omitted sequence of portions of the AC waveform, the additional omitted sequence indicating a group of intelligent lighting fixtures, the group of intelligent lighting fixtures being one or more of a commissioned group of intelligent lighting fixtures or a secured network of intelligent lighting fixtures, wherein the intelligent lighting fixture is further configured to join the group of intelligent lighting fixtures responsive to detecting the additional omitted sequence.

17. The lighting controller of claim 14, wherein the microprocessor is further configured to determine, subsequent to providing the modified power signal to the intelligent lighting fixture, a loss of a communication channel with the intelligent lighting fixture, and wherein the power transmission circuit is further configured to:

responsive to the determining the loss of the communication channel, provide an additional modified power signal comprising the power signal having an additional omitted sequence of portions of the AC waveform, the additional omitted sequence indicating a lighting condition, wherein the intelligent lighting fixture is further configured to provide the indicated lighting condition responsive to detecting the additional omitted sequence.

18. An intelligent lighting fixture, comprising:

a power supply configured to receive a power signal having an alternating current (AC) waveform;

a driver;

a receiver, wherein the receiver is configured to monitor the power signal for an omitted portion of the AC waveform;

a timer; and a processor, wherein the processor is configured to:

receive, from the receiver, an indication of the omitted portion of the AC waveform;

responsive to receiving the indication, receive from the timer a duration of the omitted portion of the AC waveform;

based on the duration, determine that the omitted portion of the AC waveform matches a commissioning pattern;

responsive to determining that the omitted portion of the AC waveform matches the commissioning pattern, enter a commissioning mode; and while operating in the commissioning mode, modify a commissioned group of the intelligent lighting fixture.

19. The intelligent lighting fixture of claim 18, wherein:

the processor is further configured to, responsive to receiving the indication from the receiver, provide an interrupt signal to the timer, and the timer is configured to, responsive to receiving the interrupt signal from the processor, determine the duration, and to provide the duration to the processor.

20. The intelligent lighting fixture of claim 19, wherein the timer is further configured to:

exit a sleep mode responsive to receiving the interrupt signal from the processor, and enter the sleep mode responsive to providing the duration to the processor.

21. The intelligent lighting fixture of claim 18, wherein the timer is configured to:

monitor the AC waveform of the power signal, receive, from the receiver, the indication of the omitted portion of the AC waveform, responsive to receiving the indication from the receiver, determine the duration, and provide the duration to the processor.

22. The intelligent lighting fixture of claim 18, wherein the processor is further configured to:

determine a loss of a communication channel with a lighting controller;

subsequent to determining the loss of the communication channel, receive an additional indication of an additional omitted portion of the AC waveform;

based on an additional duration of the additional omitted portion of the AC waveform, determine that the additional omitted portion of the AC waveform indicates a lighting condition; and provide a control signal to the driver, wherein the driver is configured to, responsive to the control signal, control a light emitter to provide the indicated lighting condition.

\* \* \* \* \*